US012506961B2

(12) United States Patent
Awasthi et al.

(10) Patent No.: US 12,506,961 B2
(45) Date of Patent: Dec. 23, 2025

(54) METHOD AND ELECTRONIC DEVICE FOR FRAME STABILIZATION OF A VIDEO SEQUENCE

(71) Applicant: Samsung Electronics Co., Ltd., Suwon-si (KR)

(72) Inventors: Saurabh Awasthi, Noida (IN); Garima Bedi, Noida (IN); Sachin Chugh, Noida (IN)

(73) Assignee: Samsung Electronics Co., Ltd., Suwon-si (KR)

( * ) Notice: Subject to any disclaimer, the term of this patent is extended or adjusted under 35 U.S.C. 154(b) by 352 days.

(21) Appl. No.: 18/187,230

(22) Filed: Mar. 21, 2023

(65) Prior Publication Data

US 2023/0224582 A1 Jul. 13, 2023

Related U.S. Application Data

(63) Continuation of application No. PCT/KR2022/009632, filed on Jul. 5, 2022.

(30) Foreign Application Priority Data

Aug. 4, 2021 (IN) .............................. 202141035162

(51) Int. Cl.
*H04N 23/68* (2023.01)
*G06T 7/194* (2017.01)
(Continued)

(52) U.S. Cl.
CPC ........... *H04N 23/682* (2023.01); *G06T 7/194* (2017.01); *G06T 7/246* (2017.01); *G06T 7/70* (2017.01);
(Continued)

(58) Field of Classification Search
CPC ............... H04N 23/682; H04N 23/683; H04N 23/6811; H04N 5/145; G06T 7/194;
(Continued)

(56) References Cited

U.S. PATENT DOCUMENTS 6,975,755 B1 * 12/2005 Baumberg ................ G06T 7/97
348/42
7,558,405 B2 7/2009 Tico et al.
(Continued)

FOREIGN PATENT DOCUMENTS

| JP | 2002-056494 A | 2/2002 |
|---|---|---|
| KR | 10-2019-0102736 A | 9/2019 |
| WO | 2020/118624 A1 | 6/2020 |

OTHER PUBLICATIONS

Indian Office Action dated Nov. 15, 2023, issued in Indian Patent Application No. 202141035162.
(Continued)

*Primary Examiner* — Abdelaaziz Tissire
(74) *Attorney, Agent, or Firm* — Jefferson IP Law, LLP

(57) ABSTRACT

A method for stabilization of a video sequence captured by an electronic device is provided. The method includes identifying a subject in the video sequence, estimating a velocity of the subject relative to the electronic device, determining a point of view of a subject in the video sequence with respect to the electronic device and the velocity of the subject relative to the electronic device and stabilizing the video sequence based on the determined point of view.

20 Claims, 18 Drawing Sheets

(51) Int. Cl.
  *G06T 7/246* (2017.01)
  *G06T 7/70* (2017.01)
  *G06V 10/44* (2022.01)
  *G06V 10/46* (2022.01)
  *G06V 10/74* (2022.01)

(52) U.S. Cl.
  CPC .............. *G06V 10/44* (2022.01); *G06V 10/46* (2022.01); *G06V 10/761* (2022.01); *G06T 2207/30241* (2013.01); *G06V 2201/07* (2022.01)

(58) Field of Classification Search
  CPC . G06T 7/246; G06T 7/70; G06T 2207/30241; G06T 7/73; G06T 7/80; G06T 2207/10016; G06T 2207/20081; G06T 2207/20084; G06T 2207/20182; G06T 2207/20201; G06T 5/00; G06V 10/44; G06V 10/46; G06V 10/761; G06V 2201/07
  See application file for complete search history.

(56) References Cited

U.S. PATENT DOCUMENTS

| | | | |
|---|---|---|---|
| 8,031,229 B2 * | 10/2011 | Mori | H04N 23/73 348/208.99 |
| 8,803,947 B2 | 8/2014 | Cho et al. | |
| 9,300,873 B2 | 3/2016 | Zhou et al. | |
| 9,639,959 B2 | 5/2017 | Qi et al. | |
| 9,674,440 B2 | 6/2017 | Karpenko | |
| 9,865,064 B2 | 1/2018 | Kuchiki | |
| 10,425,582 B2 | 9/2019 | Kopf | |
| 2008/0166045 A1 * | 7/2008 | Xu | G06T 7/277 382/170 |
| 2009/0096879 A1 * | 4/2009 | Motomura | G03B 5/00 348/208.6 |
| 2009/0232216 A1 * | 9/2009 | Kurata | H04N 19/527 375/E7.076 |
| 2013/0107066 A1 | 5/2013 | Venkatraman et al. | |
| 2014/0071299 A1 | 3/2014 | Grundmann et al. | |
| 2016/0379374 A1 * | 12/2016 | Sokeila | G06T 7/246 348/43 |
| 2017/0126977 A1 | 5/2017 | Klivington et al. | |
| 2017/0206441 A1 | 7/2017 | Miyano | |
| 2017/0358103 A1 | 12/2017 | Shao et al. | |
| 2018/0241984 A1 * | 8/2018 | Sun | G06V 10/255 |
| 2018/0309930 A1 | 10/2018 | Gyotoku | |
| 2019/0342479 A1 | 11/2019 | Gefen et al. | |
| 2020/0077019 A1 * | 3/2020 | Kim | H04N 23/951 |
| 2020/0322591 A1 | 10/2020 | Yano et al. | |
| 2020/0402243 A1 | 12/2020 | Benou et al. | |
| 2022/0078347 A1 * | 3/2022 | Qian | H04N 23/6811 |

OTHER PUBLICATIONS

European Search Report dated Dec. 9, 2024, issued in European Application No. 22853274.3.

* cited by examiner

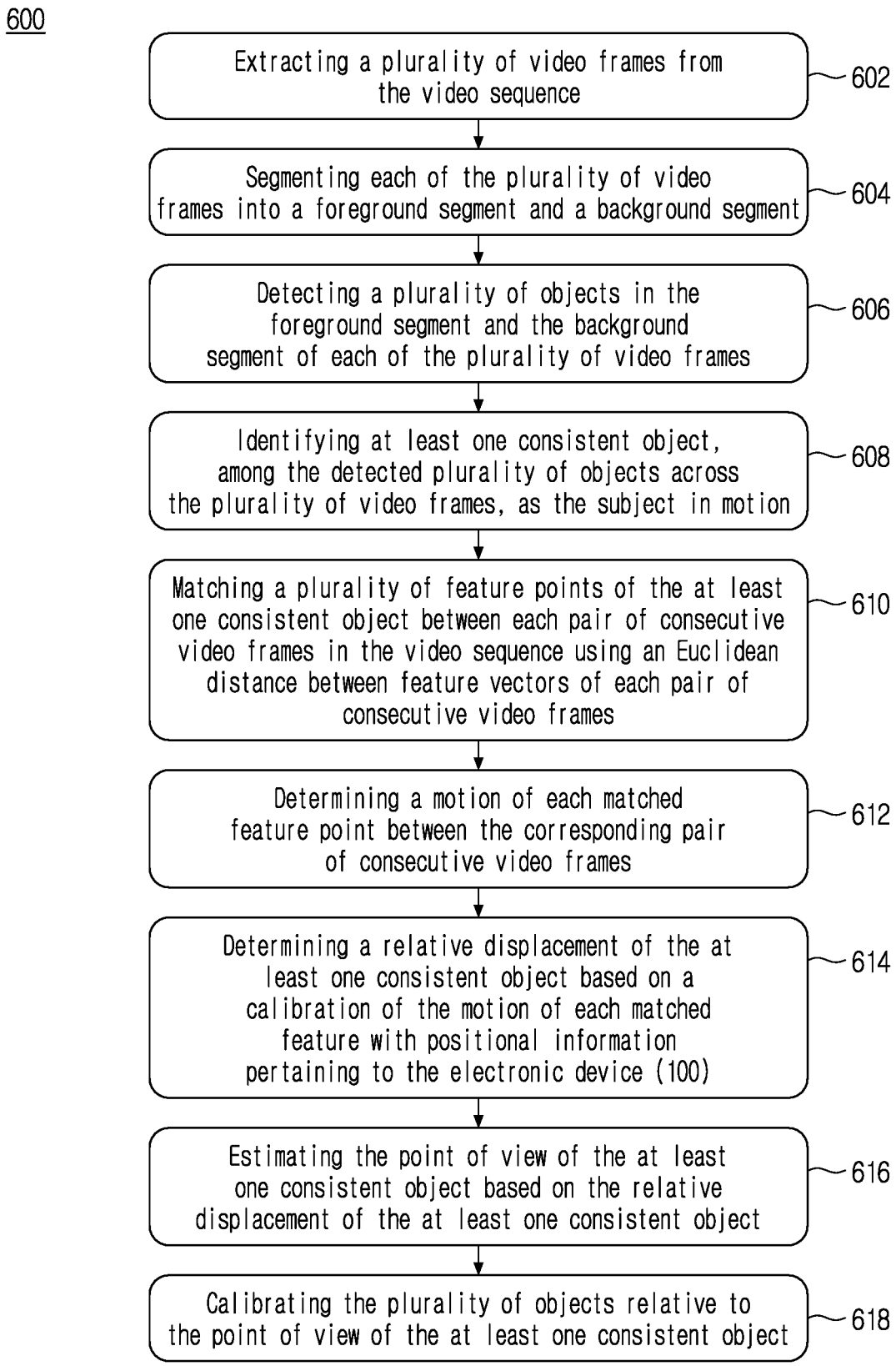

802 — Identifying a reference background model of each of the plurality of video frames by detecting an abrupt and extensive scene change among the plurality of video frames, wherein the background model corresponds to local texture features and photometric features of each of the plurality of video frames

804 — Segmenting the texture features and the photometric features of each of the plurality of video frames as a background segment if the texture features and the photometric features of the video frame match with the texture features and the photometric features of the background model

806 — Segmenting the texture features and the photometric features of each of the plurality of video frames as a foreground segment if the texture features and the photometric features of the video frame do not match with the texture features and the photometric features of the background model

808 — Updating the reference background model by accumulating the outcomes of segmenting each of the plurality of video frames into a background segment and a foreground segment

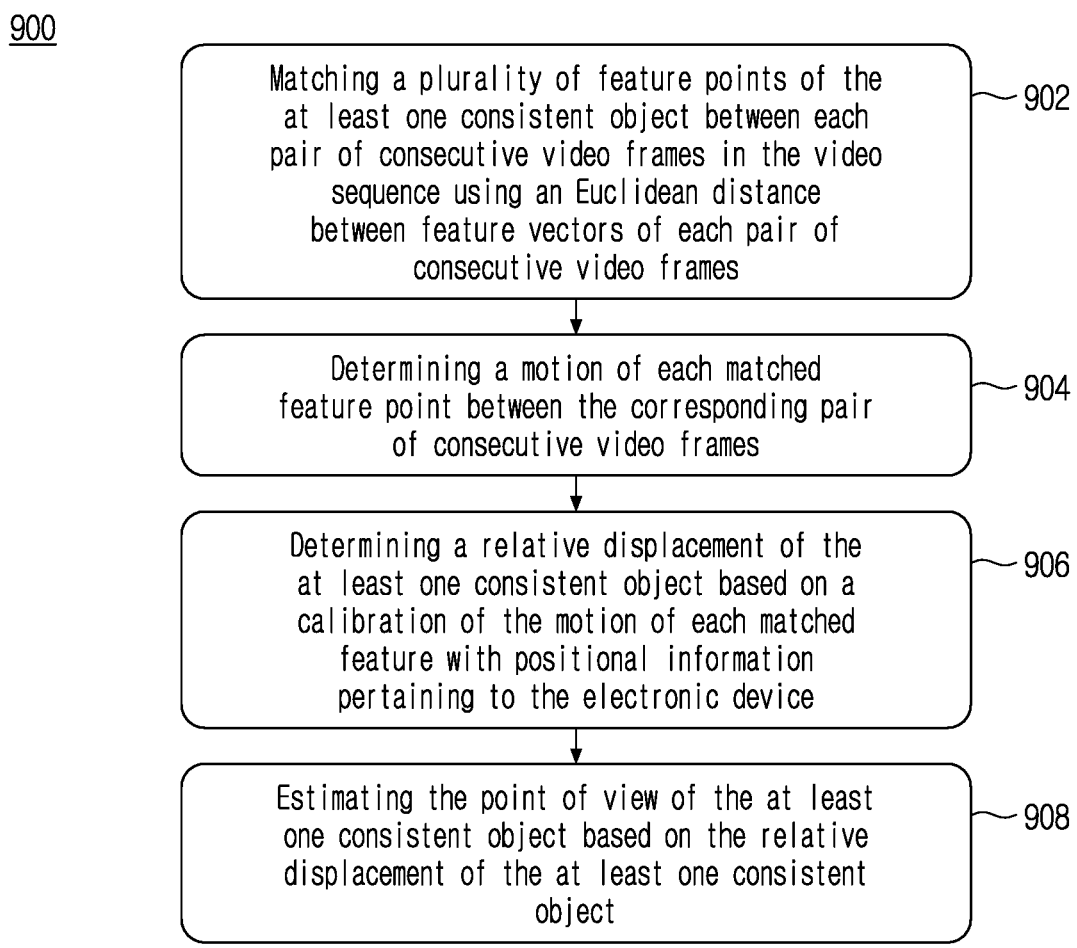

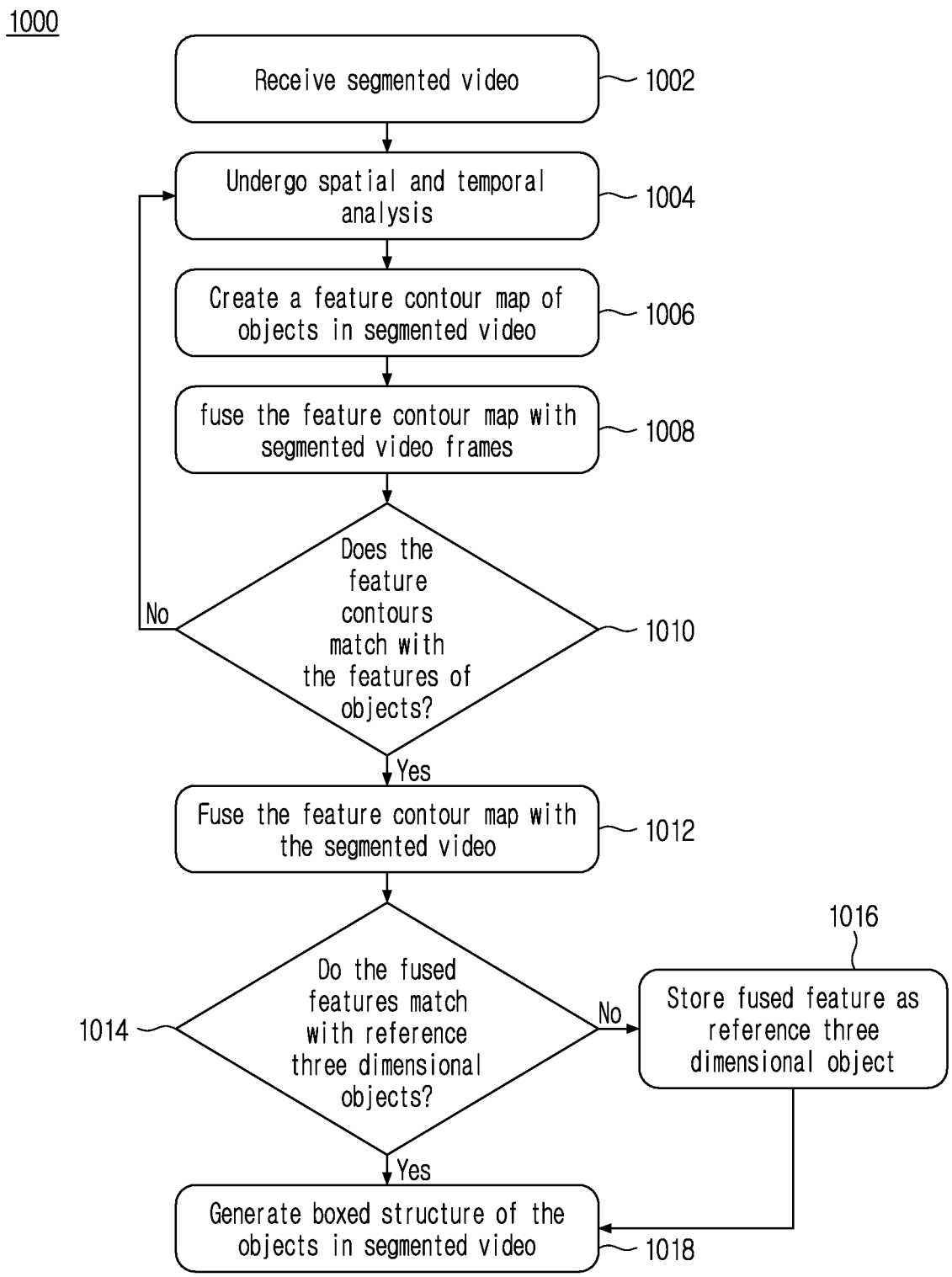

FIG. 13
1300
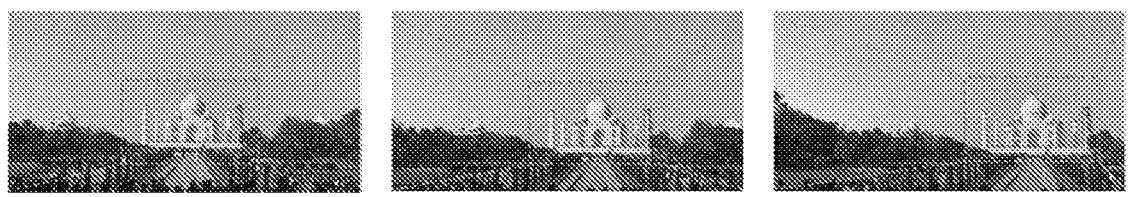
Frame t    Frame t+1    Frame t+2
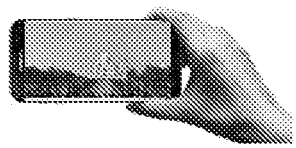 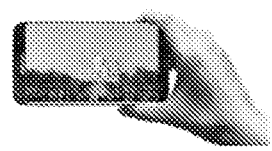 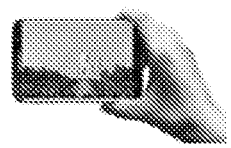
Straight view    25 degree Tilt    40 degree Tilt

FIG. 14
1400
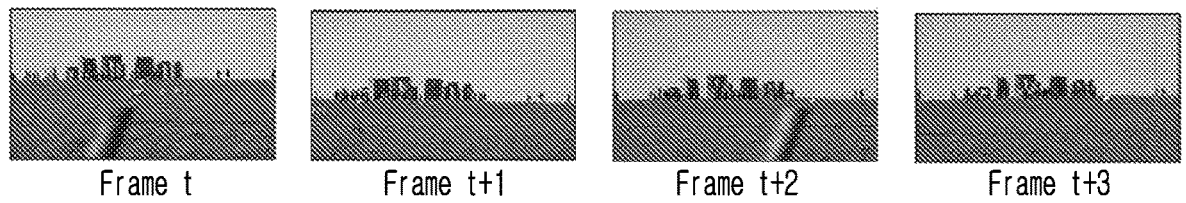
Frame t    Frame t+1    Frame t+2    Frame t+3
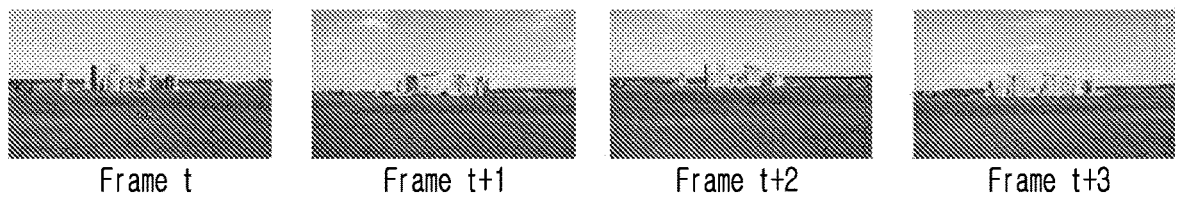
Frame t    Frame t+1    Frame t+2    Frame t+3
Spherical Point of View of Subject

METHOD AND ELECTRONIC DEVICE FOR FRAME STABILIZATION OF A VIDEO SEQUENCE

CROSS-REFERENCE TO RELATED APPLICATION(S)

This application is a continuation application, claiming priority under § 365(c), of an International application No. PCT/KR2022/009632, filed on Jul. 5, 2022, which is based on and claims the benefit of an Indian patent application number 202141035162, filed on Aug. 4, 2021, in the Indian Intellectual Property Office, the disclosure of which is incorporated by reference herein in its entirety.

TECHNICAL FIELD

The disclosure relates to image and video processing. More particularly, the disclosure relates to a method and an electronic device for frame stabilization of a video sequence.

BACKGROUND ART

In current fast paced environments, most multimedia content is shot in motion. However, recording videos when a camera is moving, or not stable, poses a challenging task. The following challenges are observed in capturing the subject or scene of concern:
1. Noise in an image in the form of unwanted objects in scene.
2. The camera is moved suddenly due to a push or jerk.
3. Motion of the camera by a user to capture all relevant angles of subject.

A broad range of video equipment from cameras in smart phone to video equipment for large production studios are available to individuals and businesses. The video footage recorded by video equipment often appear wobbly due to unwanted motion of objects in the recorded video due to e.g., unintended shaking of the camera, rolling shutter effect, etc.

Different techniques are used to stabilize a video sequence and remove unwanted camera movements. The objective of motion stabilization is to remove the jitter produced by hand-held devices. Camera jitter introduces extraneous motion that is not related to the actual motion of objects in the picture. Therefore, the motion appears as random picture movements that produce disturbing visual effects.

Image stabilization methods have been developed in the past that model the camera motion and distinguish between intended and unintended motions. Other methods have also been developed that generate a set of curves to track different camera movements such as translation, rotation, and zoom. The curves are smoothed and the differences between the unsmoothed curves and the smoothed curves are used to define a set of transformations to apply to each video image to remove the unwanted camera motion.

There is a need for mechanisms that can modify captured video such that the final output video is devoid of jitters and unwanted camera motion. Thus, it is desired to at least provide a pre-processing technique to modify captured video such that final video is devoid of the above issues.

The above information is presented as background information only to assist with an understanding of the disclosure. No determination has been made, and no assertion is made, as to whether any of the above might be applicable as prior art with regard to the disclosure.

TECHNICAL SOLUTION

Aspects of the disclosure are to address at least the above-mentioned problems and/or disadvantages and to provide at least the advantages described below. Accordingly, an aspect of the disclosure is to provide a method of stabilization of a video sequence based on determination of a point of view (PoV) of a camera lens in the video sequence.

Another aspect of the disclosure is to determine a point of view of the subject in the video sequence.

Another aspect of disclosure is to extract video frames from the vide sequence and segment each frame into a foreground segment and a background segment.

Another aspect of the disclosure is to generate a three dimensional (3D) structure of the subject in the video sequence and fuse the relative three dimensional structure in each frame of the video sequence.

In accordance with an aspect of the disclosure, a method for stabilization of a video sequence captured by an electronic device is provided. The method includes identifying a subject in the video sequence, estimating a velocity of the subject relative to the electronic device, determining a point of view of a subject in motion in the video sequence with respect to the electronic device and the velocity of the subject in motion relative to the electronic device, and stabilizing the video sequence based on the determined point of view.

In an embodiment, wherein determining a point of view of a subject in motion in the video sequence with respect to the electronic device comprises extracting, by the electronic device, a plurality of video frames from the video sequence, segmenting, by the electronic device, each of the plurality of video frames into a foreground segment and a background segment, detecting, by the electronic device, a plurality of objects in the foreground segment and the background segment of each of the plurality of video frames, identifying, by the electronic device, at least one consistent object, among the detected plurality of objects across the plurality of video frames, as the subject in motion, detecting, by the electronic device, a point of view of the at least one consistent object, and calibrating, by the electronic device, the plurality of objects relative to the point of view of the at least one consistent object.

In an embodiment, wherein segmenting each of the plurality of video frames into a foreground segment and a background segment comprises identifying a reference background model of each of the plurality of video frames by detecting an abrupt and extensive scene change among the plurality of video frames, wherein the background model corresponds to local texture features and photometric features of each of the plurality of video frames, segmenting the texture features and the photometric features of each of the plurality of video frames as a background segment if the texture features and the photometric features of the video frame match with the texture features and the photometric features of the background model, segmenting the texture features and the photometric features of each of the plurality of video frames as a foreground segment if the texture features and the photometric features of the video frame do not match with the texture features and the photometric features of the background model, and updating the reference background model by accumulating the outcomes of segmenting each of the plurality of video frames into a background segment and a foreground segment.

In an embodiment, wherein detecting a plurality of objects across the plurality of video frames comprises matching a plurality of features between each pair of consecutive video frames in the video sequence, and detecting a plurality of objects across the plurality of video frames based on the matched plurality of feature points.

In an embodiment, wherein detecting a point of view of the at least one consistent object comprises matching a plurality of feature points of the at least one consistent object between each pair of consecutive video frames in the video sequence using an Euclidean distance between feature vectors of consecutive video frames, determining a motion of each matched feature point between the corresponding pair of consecutive video frames, determining a relative displacement of the at least one consistent object based on a calibration of the motion of each matched feature with positional information pertaining to the electronic device, and estimating the point of view of the at least one consistent object based on the relative displacement of the at least one consistent object.

In an embodiment, wherein stabilizing the video sequence based on the determined point of view comprises estimating, by the electronic device, a motion trajectory of the calibrated plurality of objects and the at least one consistent object across the plurality of video frames, detecting, by the electronic device, anomalous motions and distortions of the calibrated plurality of objects and the at least one consistent object relative to the estimated trajectory, and removing, by the electronic device, the detected anomalous motions and distortions.

In an embodiment, wherein anomalous motions and distortions is directed to Camera shifts (translation), distortion (scaling) and undesirable motion (rotation).

In an embodiment, wherein estimating a motion trajectory of the reconstructed plurality of objects and the at least one consistent object across the plurality of video frames, identifying a plurality of features pertaining to the reconstructed plurality of objects and the at least one consistent object, match feature vectors for each pair of features between two consecutive video frames of the plurality of video frames, estimating a motion of the reconstructed plurality of objects and the at least one consistent object between two consecutive video frames, estimating similarity matrices for each pair of consecutive video frames of the plurality of video frames, and determining a trajectory for each of the vectors of the estimated similarity matrices across the plurality of video frames.

In an embodiment, the method further comprises aligning, by the electronic device, the calibrated plurality of objects and the at least one consistent object with the corresponding background segment and the foreground segment of each of the plurality of video frames by matching features of the calibrated plurality of objects with the features of the plurality of objects in the foreground segments and the background segments of each of the plurality of video frames, aligning, by the electronic device, the trajectory of the calibrated plurality of objects and the at least one consistent object pertaining to the single frame across the plurality of video frames with the motion of the plurality of objects in the foreground segment and the background segment of each of the plurality of video frames, transforming, by the electronic device, the plurality of objects in the foreground segments of each of the plurality of video frames to align with the corresponding plurality of objects in the background segments of each of the plurality of video frames, reconstructing, by the electronic device, each of the plurality of video frames by fusing the plurality of objects, creating, by the electronic device, at least one dense matching map of each of the plurality of video frames by matching each of the reconstructed plurality of frames corresponding to the point of view with the plurality of frames corresponding to other points of view, and fusing, by the electronic device, the at least one dense matching map with the plurality of video frames pertaining to the video sequence.

In accordance with another aspect of the disclosure, an electronic device for stabilization of a video sequence captured is provided. The electronic device includes a camera lens communicably coupled to a memory and positioner configured to capture the video sequence, a video frame extractor communicably coupled to the memory and positioner configured to identify a subject, a Point of View (PoV) calibrator communicably coupled to the video frame extractor, the PoV calibrator configured to estimating a velocity of the subject relative to the camera lens, and determine a point of view of the subject in the video sequence with respect to the camera lens and the velocity of the subject relative to the camera lens, a frame stabilizer communicably coupled to the PoV calibrator configured to stabilize the video sequence based on the determined point of view, an object synthesizer communicably coupled to the frame stabilizer, the object synthesizer configured to align calibrated plurality of objects and the at least one consistent object with the corresponding background segment and the foreground segment of each of the plurality of video frames by matching features of the calibrated plurality of objects with the features of the plurality of objects in the foreground segments and the background segments of each of the plurality of video frames, align the trajectory of the calibrated plurality of objects and the at least one consistent object pertaining to the single frame across the plurality of video frames with the motion of the plurality of objects in the foreground segment and the background segment of each of the plurality of video frames, transform the plurality of objects in the foreground segments of each of the plurality of video frames to align with the corresponding plurality of objects in the background segments of each of the plurality of video frames, a video generator communicably coupled to the object synthesizer, the video generator configured to reconstruct each of the plurality of video frames by fusing the plurality of objects, create at least one dense matching map of each of the plurality of video frames by matching each of the reconstructed plurality of frames corresponding to the point of view with the plurality of frames corresponding to other points of view, and fuse the at least one dense matching map with the plurality of video frames pertaining to the video sequence.

Other aspects, advantages, and salient features of the disclosure will become apparent to those skilled in the art from the following detailed description, which, taken in conjunction with the annexed drawings, discloses various embodiments of the disclosure.

BRIEF DESCRIPTION OF DRAWINGS

The above and other aspects, features, and advantages of certain embodiments of the disclosure will be more apparent from the following description taken in conjunction the accompanying drawings, in which:

FIG. 6 is a flow diagram illustrating determining a point of view of a subject in a video sequence with respect to an electronic device, according to an embodiment of the disclosure;

FIG. 8 is a flow diagram illustrating segmenting video frames of a video sequence into a foreground segment and a background segment, according to an embodiment of the disclosure;

FIG. 9 is a flow diagram illustrating detecting a plurality of objects across the plurality of video frames, according to an embodiment of the disclosure;

FIG. 10 is a flow diagram illustrating spatial object creation, according to an embodiment of the disclosure;

FIGS. 13, 14, 15, 16, and 17 illustrate scenarios where a captured video sequence is stabilized, according to various embodiments of the disclosure;

Throughout the drawings, it should be noted that like reference numbers are used to depict the same or similar elements, features, and structures.

DETAILED DESCRIPTION

Figure 1:
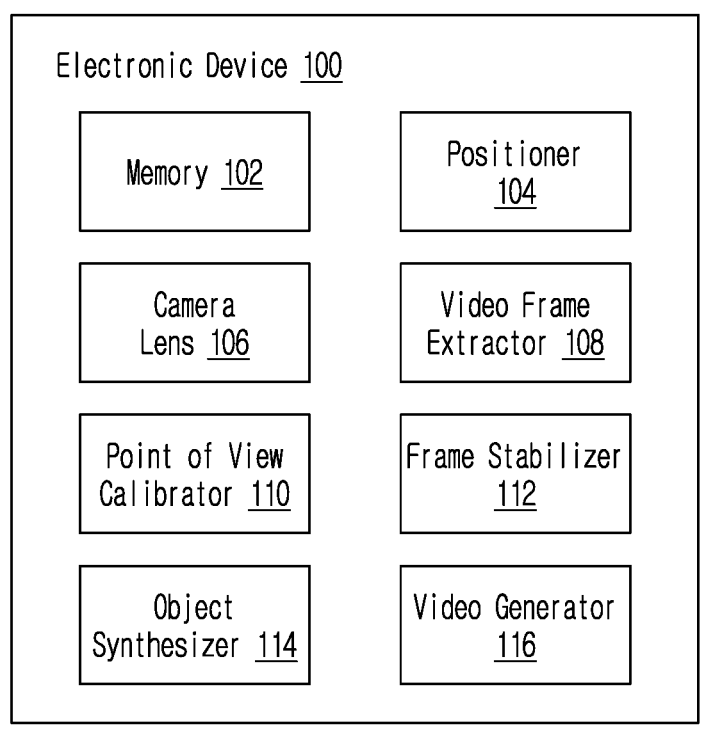
FIG. 1 illustrates a block diagram of an electronic device (100) for stabilization of a video sequence captured, according to an embodiment of the disclosure.

The following description with reference to the accompanying drawings is provided to assist in a comprehensive understanding of various embodiments of the disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the disclosure. Accordingly, it should be apparent to those skilled in the art that the following description of various embodiments of the disclosure is provided for illustration purpose only and not for the purpose of limiting the disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

As is traditional in the field, embodiments may be described and illustrated in terms of blocks which carry out a described function or functions. These blocks, which may be referred to herein as units or modules or the like, are physically implemented by analog or digital circuits such as logic gates, integrated circuits, microprocessors, microcontrollers, memory circuits, passive electronic components, active electronic components, optical components, hardwired circuits, or the like, and may optionally be driven by firmware. The circuits may, for example, be embodied in one or more semiconductor chips, or on substrate supports such as printed circuit boards and the like. The circuits constituting a block may be implemented by dedicated hardware, or by a processor (e.g., one or more programmed microprocessors and associated circuitry), or by a combination of dedicated hardware to perform some functions of the block and a processor to perform other functions of the block. Each block of the embodiments may be physically separated into two or more interacting and discrete blocks without departing from the scope of the disclosure. Likewise, the blocks of the embodiments may be physically combined into more complex blocks without departing from the scope of the disclosure The accompanying drawings are used to help easily understand various technical features and it should be understood that the embodiments presented herein are not limited by the accompanying drawings. As such, the disclosure should be construed to extend to any alterations, equivalents and substitutes in addition to those which are particularly set out in the accompanying drawings. Although the terms first, second, etc. may be used herein to describe various elements, these elements should not be limited by these terms. These terms are generally only used to distinguish one element from another.

Accordingly, embodiments herein disclose a method for stabilization of a video sequence captured by an electronic device, the method comprising identifying a subject in the video sequence; estimating a velocity of the subject relative to the electronic device; determining a point of view of a subject in the video sequence with respect to the electronic device and the velocity of the subject relative to the electronic device; and stabilizing the video sequence based on the determined point of view.

In an embodiment, wherein determining a point of view of a subject in the video sequence with respect to the electronic device comprises extracting, by the electronic device, a plurality of video frames from the video sequence; segmenting, by the electronic device, each of the plurality of video frames into a foreground segment and a background segment; detecting, by the electronic device, a plurality of objects in the foreground segment and the background segment of each of the plurality of video frames; identifying, by the electronic device, at least one consistent object, among the detected plurality of objects across the plurality of video frames, as the subject; detecting, by the electronic device, a point of view of the at least one consistent object; and calibrating, by the electronic device, the plurality of objects relative to the point of view of the at least one consistent object.

Unlike existing methods and systems, the proposed method allows the electronic device with stabilization of a video sequence based on determination of a point of view of a subject in the video sequence.

Unlike existing methods and systems, the proposed method allows the electronic device to determine a point of view of the subject in the video sequence.

Unlike existing methods and systems, the proposed method allows the electronic device to extract video frames from the vide sequence and segment each frame into a foreground segment and a background segment.

Unlike existing methods and systems, the proposed method allows the electronic device to generate a three dimensional structure of the subject in the video sequence and fuse the same in each frame of the video sequence.

Unlike existing methods and systems, the proposed method allows the electronic device to fuse the three dimensional structure with the foreground and background segments of the video frames.

Referring now to the drawings, and more particularly to FIGS. 1 to 4, 5A, 5B, and 6 to 17, where similar reference characters denote corresponding features consistently throughout the figures, there are shown preferred embodiments.

FIG. 1 illustrates a block diagram of an electronic device for stabilization of a video sequence captured, according to an embodiment of the disclosure.

Referring to FIG. 1, the electronic device 100 a camera lens 106 communicably coupled to a memory 102 and a positioner 104 configured to capture the video sequence; a video frame extractor 108 communicably coupled to the memory 102 and positioner 104 configured to identify a subject, a Point of View (PoV) calibrator 110 communicably coupled to the video frame extractor 108, the PoV calibrator 110 configured to estimating a velocity of the subject relative to the camera lens 106, and determine a point of view of the subject in the video sequence with respect to the camera lens 106 and the velocity of the subject relative to the camera lens 106; a frame stabilizer 112 communicably coupled to the PoV calibrator 110 configured to stabilize the video sequence based on the determined point of view; an object synthesizer 114 communicably coupled to the frame stabilizer 112, the object synthesizer configured to align calibrated plurality of objects and the at least one consistent object with the corresponding background segment and the foreground segment of each of the plurality of video frames by matching features of the calibrated plurality of objects with the features of the plurality of objects in the foreground segments and the background segments of each of the plurality of video frames, align the trajectory of the calibrated plurality of objects and the at least one consistent object pertaining to the single frame across the plurality of video frames with the motion of the plurality of objects in the foreground segment and the background segment of each of the plurality of video frames; transform the plurality of objects in the foreground segments of each of the plurality of video frames to align with the corresponding plurality of objects in the background segments of each of the plurality of video frames; a video generator 116 communicably coupled to the object synthesizer 114, the video generator 116 configured to: reconstruct each of the plurality of video frames by fusing the plurality of objects; create at least one dense matching map of each of the plurality of video frames by matching each of the reconstructed plurality of frames corresponding to the point of view with the plurality of frames corresponding to other points of view; and fuse the at least one dense matching map with the plurality of video frames pertaining to the video sequence.

Figure 2:
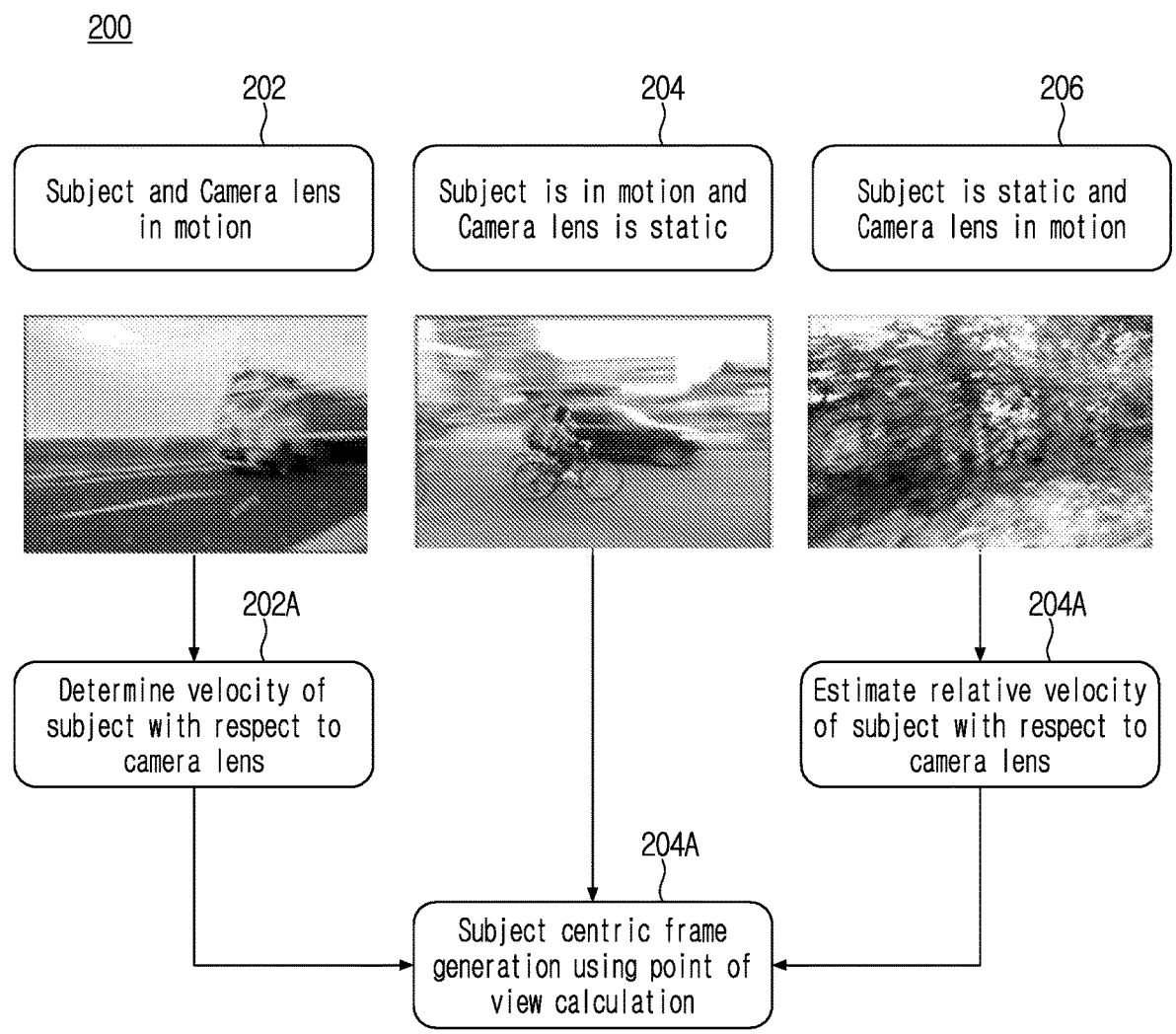
FIG. 2 is a flow diagram illustrating a method for stabilization of a video sequence captured, according to an embodiment of the disclosure.

FIG. 2 is a flow diagram illustrating a method for stabilization of a video sequence captured, according to an embodiment of the disclosure.

Referring to FIG. 2, videos can be captured in any of four scenarios, namely, when a subject and the camera lens 106 is in motion 202, when the subject is in motion and the camera lens 106 is stationary or static 204, when the subject is stationary or static and the camera lens 106 is in motion 206 and when the subject and the camera lens 106 are stationary (not shown). In either of these scenarios, a relative velocity with respect to the subject and the camera lens 106 is determined in 202A and 204A. Accordingly, a point of view with respect to the subject is determined and the subject is followed across all video frames of the video sequence captured through the camera lens 106.

Figure 3:
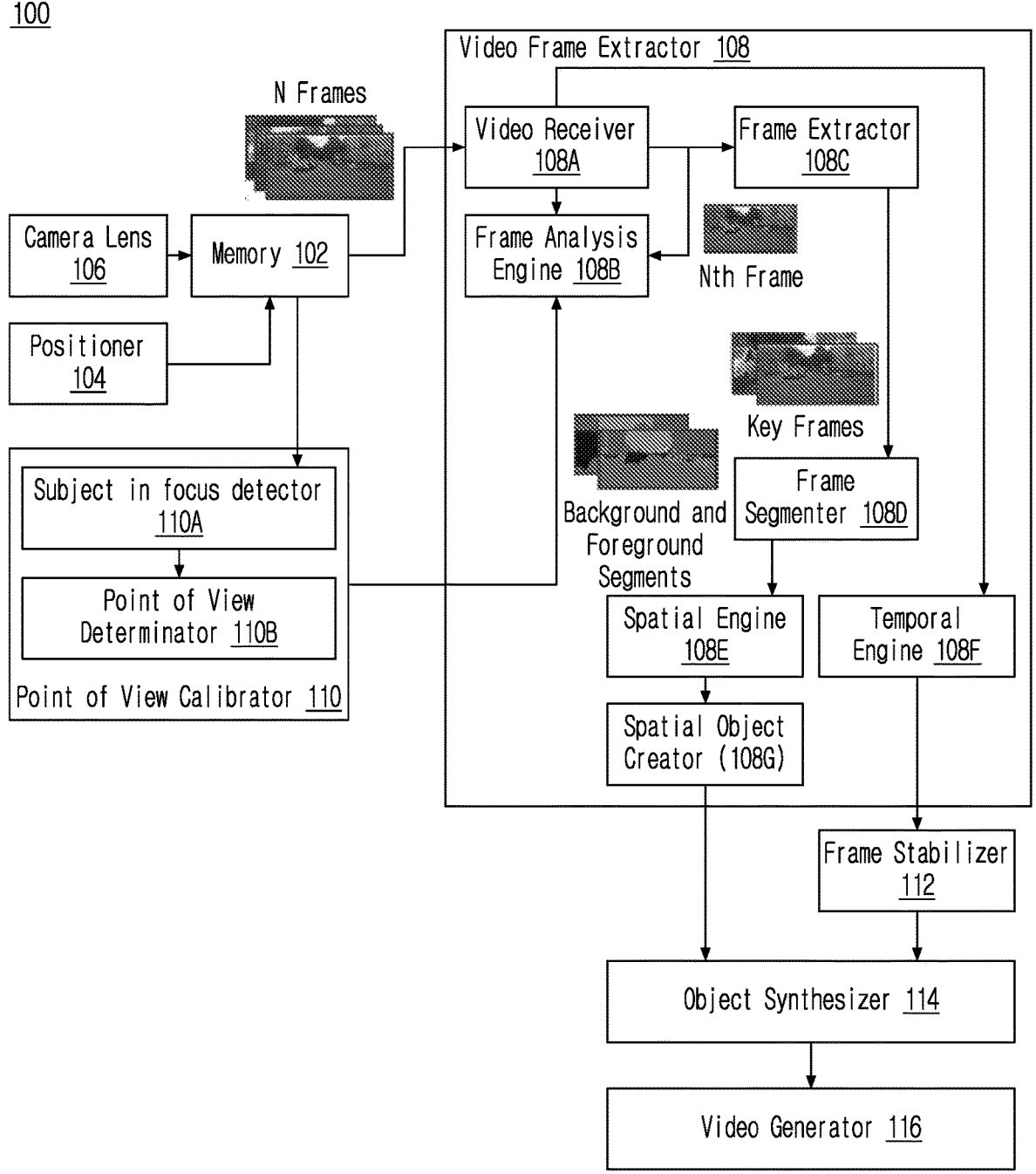
FIG. 3 is a flow diagram illustrating a sequence of operations in an electronic device, according to an embodiment of the disclosure.

FIG. 3 is a flow diagram illustrating a sequence of operations in an electronic device, according to an embodiment of the disclosure.

Referring to FIG. 3, typically, the camera lens 106 captures a video sequence which is stored in the memory 102. The position information pertaining to the camera lens and the video sequence captured is estimated by the positioner 104 and further stored in the memory 102. The video frame extractor 108 comprises a video receiver 108A, a frame extractor 108C, a frame analysis engine 108B, a frame segmenter 108D, a spatial engine 108E, a temporal engine 108F and a spatial object creator 108G. The captured video is received at the video frame extractor 108 via the video receiver 108A. The point of view calibrator 110 may include a subject in focus detector 110A and a point of view determinator 110B.

Figure 4:
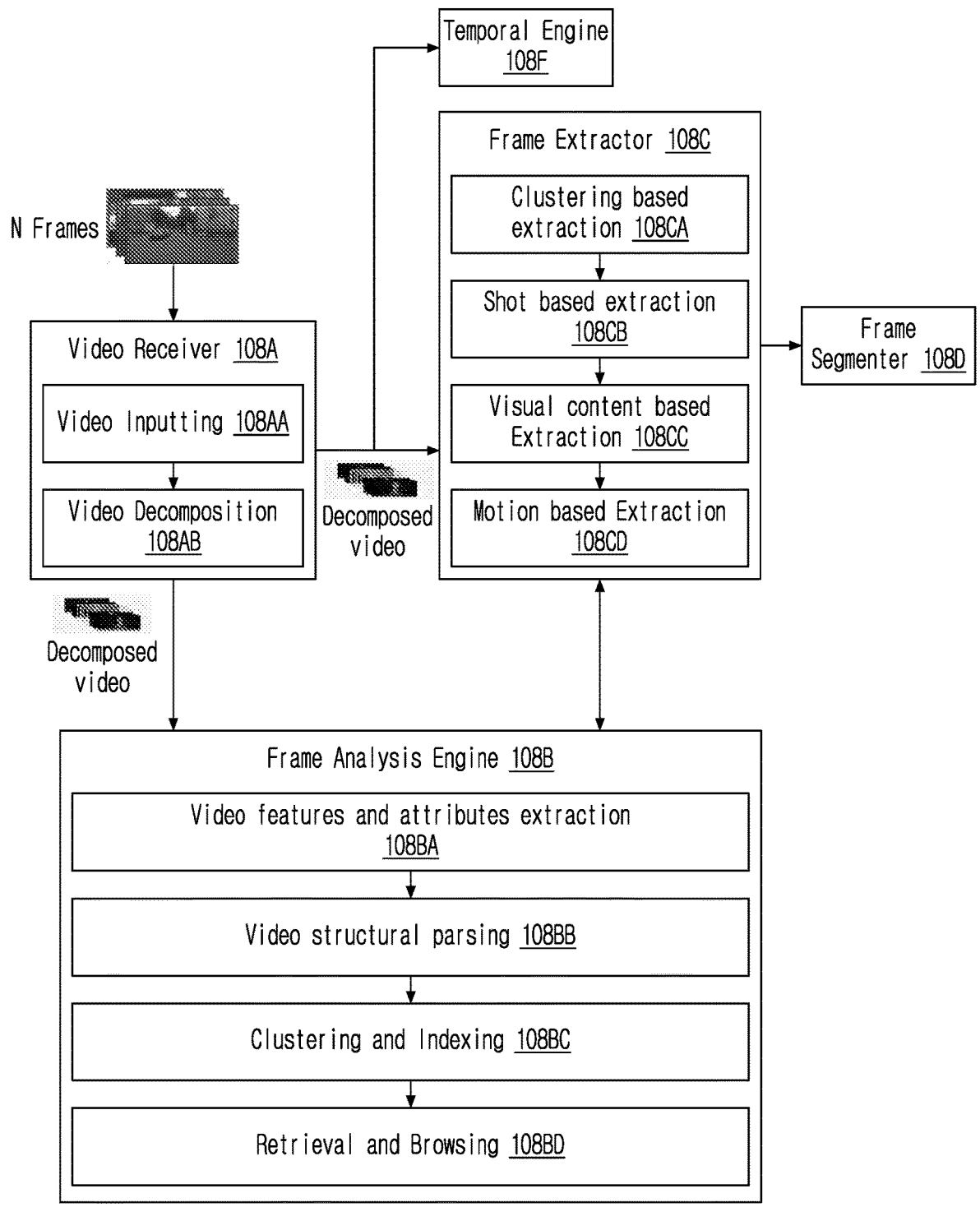
FIG. 4 is a flow diagram illustrating a sequence of operations in an electronic device, according to an embodiment of the disclosure.

FIG. 4 is a flow diagram illustrating a sequence of operations in an electronic device for frame segmentation, according to an embodiment of the disclosure.

Referring to FIG. 4, the video sequence captured is decomposed in the video receiver 108A through operations of video inputting 108AA and video decomposition 108AB. The decomposed video is transferred to the frame extractor 108C and the temporal engine 108F for further processing. A plurality of frames are extracted from the decomposed video through clustering based extraction 108CA, shot based extraction 108CB, visual content based extraction 108CC and motion based extraction 108CD and further sent to the frame segmenter 108D to be segmented into a background segment and a foreground segment. The decomposed video also undergoes video features and attributes extraction 108BA, video structural parsing 108BB, clustering and indexing 108BC and retrieval and browsing 108BD in the frame analysis engine 108B, all of which information is further used by the frame extractor 108C to extract the plurality of frames. The plurality of frames is a sequence of frames corresponding to a timestamp pertaining to the captured video sequence. The changes in various objects in the video sequence is captured at various instants or timestamps pertaining to the video sequence in each of the plurality of video frames.

Figure 5A:
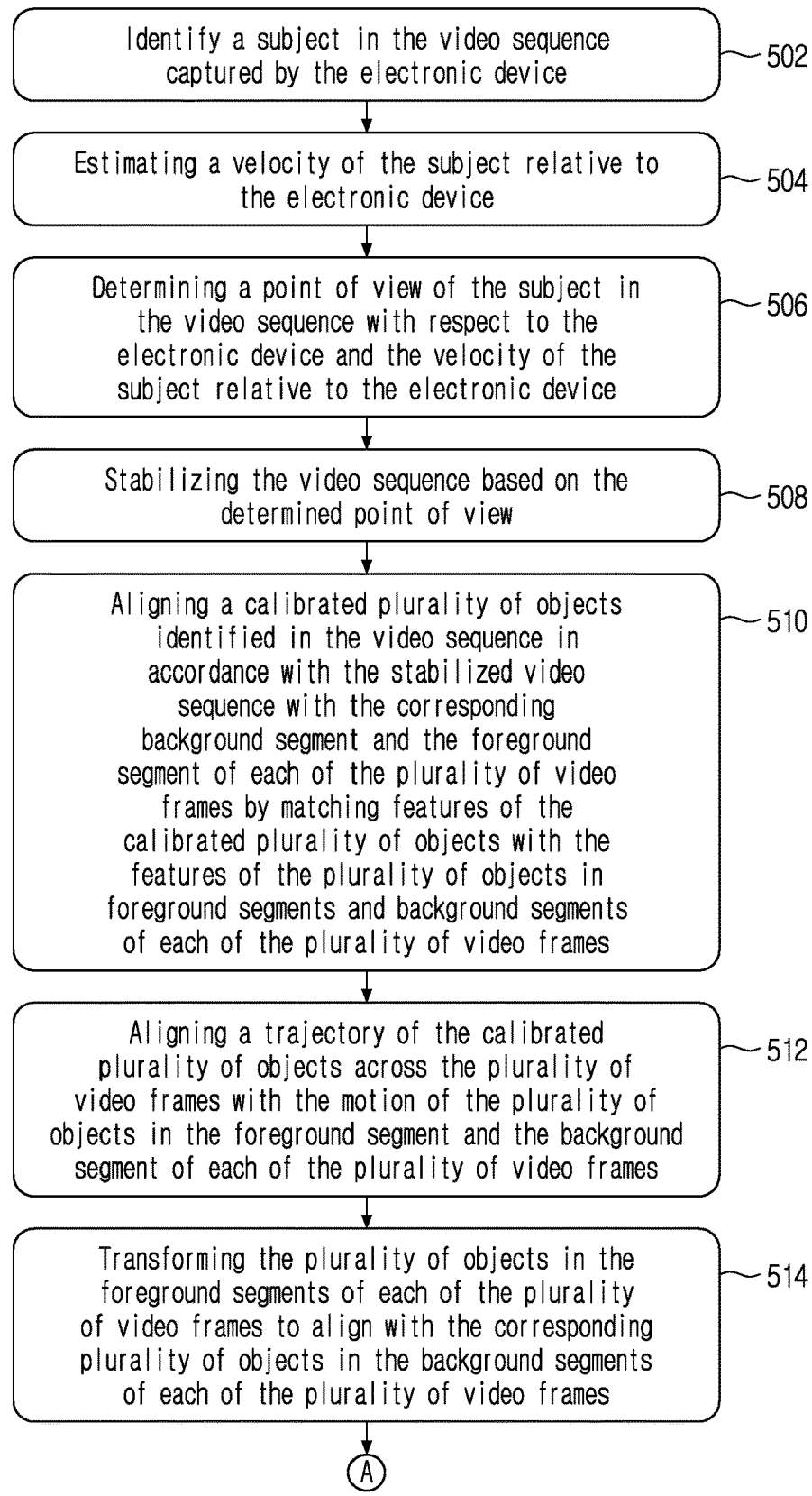
FIGS. 5A and 5B is a flow diagram illustrating a method for stabilization of a video sequence captured, according to various embodiments of the disclosure.
Figure 5B:
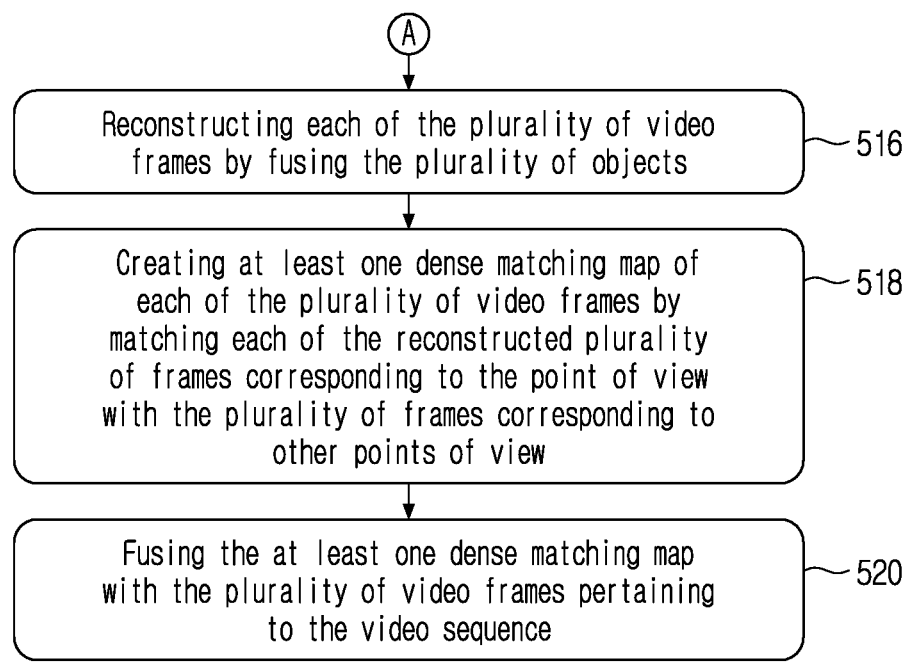

FIGS. 5A and 5B is a flow diagram illustrating a method for stabilization of a video sequence captured, according to various embodiments of the disclosure.

Referring to FIGS. 5A and 5B, in a method 500, a subject is initially identified in the video sequence captured by the camera lens 106 of the electronic device 100 at operation 502. The velocity of the subject relative to the electronic device 100 is estimated by the positioner 104 at operation 504. At operation 506, a point of view of the subject with respect to the electronic device (100) and the velocity of the subject relative to the electronic device (100) is determined. At operation 508, in accordance with the determined point of view, the video sequence is stabilized. At operation 510, a calibrated plurality of objects identified in the plurality of video frames is aligned in accordance with the stabilized video sequence with the corresponding background segment and the foreground segment of each of the plurality of video frames by matching features of the calibrated plurality of objects with the features of the plurality of objects in foreground segments and background segments of each of the plurality of video frames. At operation 512, a trajectory of the calibrated plurality of objects across the plurality of video frames is aligned with the motion of the plurality of objects in the foreground segment and the background segment of each of the plurality of video frames. At operation 514, the plurality of objects in the foreground segments of each of the plurality of video frames is transformed to align with the corresponding plurality of objects in the background segments of each of the plurality of video frames. At operation 516, each of the plurality of video frames is reconstructed by fusing the plurality of objects using the object synthesizer 114 and the video generator 116.

The objective of this operation is to find out the same features in different images and match them. The features used in structure recovery processes are points and lines. So, here features are understood as points or lines. It detects the features, their location and scale as well.

Suppose there are two frames of a scene and already have extracted some features of them. To find corresponding pairs of features, feature descriptors are needed. A descriptor is a process that takes information of features and image to produce descriptive information i.e. features' description, which are usually presented in form of features vectors.

The descriptions then are used to match a feature to one in another image. A descriptor should be invariant to rotation, scaling, and affine transformation so the same feature on different images will be characterized by almost the same value and distinctive to reduce number of possible matches.

At operation 518, at least one dense matching map of each of the plurality of video frames is created using the video generator 116 by matching each of the reconstructed plurality of frames corresponding to the point of view with the plurality of frames corresponding to other points of view.

The motion information is the position, orientation, and intrinsic parameters of the camera at the captured views. The structure information is captured by the 3D coordinates of features. Given feature correspondences, the geometric constraints among views can be established. The projection matrices that represent the motion information then may be recovered. Finally, 3D coordinates of features, i.e. structure information, can be computed via triangulation. Reconstruction with only knowledge of feature correspondences is only possible up to a projective reconstruction and there are many ways to obtain projection matrices from a geometry constraint, i.e., a fundamental matrix or a focal tensor. Projective reconstruction refers to the computation of the structure of a scene from images taken with uncalibrated cameras, resulting in a scene structure, and camera motion that may differ from the true geometry by an unknown 3D projective transformation.

Uncalibrated camera is a camera whose parameters are less known or unknown.

The process of upgrading from projective structure to a metric one is called self-calibration or auto-calibration. The development of research on self-calibration goes from methods with strict unrealistic assumptions of camera motion and intrinsic parameters to the flexible, practical ones with minimal and realistic assumptions (e.g., self-calibration even with only the condition of squared pixels).

The structure created after the second phase is very discrete and not enough for visualization. Also, a dense depth map must be established in order to build the 3D model. This task may be divided into two sub tasks: rectification and dense stereo mapping. The first one exploits the epipolar constraint to prepare the data for the second one by aligning a corresponding pair of epipolar lines along the same scan line of images thus all corresponding points will have the same y-coordinate in two images. This makes the second task, roughly search and match over the whole image, faster. Stereo mapping is the task of establishing a dense matching map between points of different calibrated views.

At operation 520, the at least one dense matching map is fused with the plurality of video frames pertaining to the video sequence by the video generator 116.

FIG. 6 is a flow diagram illustrating determining, by a PoV calibrator, a point of view of a subject in a video sequence with respect to an electronic device, according to an embodiment of the disclosure.

Referring to FIG. 6, in a method 600, at operation 602, a plurality of video frames is extracted from the captured video sequence. At operation 604, each of the plurality of video frames is segmented into a foreground segment and a background segment. Operation 606 includes detecting a plurality of objects in the foreground segment and the background segment of each of the plurality of video frames. Operation 608 includes identifying at least one consistent object, among the detected plurality of objects across the plurality of video frames, as the subject. Operation 610 includes matching a plurality of feature points of the at least one consistent object between each pair of consecutive video frames in the video sequence using an Euclidean distance between feature vectors of consecutive video frames. Operation 612 includes determining a motion of each matched feature point between the corresponding pair of consecutive video frames. Operation 614 includes determining a relative displacement of the at least one consistent object based on a calibration of the motion of each matched feature with positional information pertaining to the electronic device 100. Operation 616 includes estimating the point of view of the at least one consistent object based on the relative displacement of the at least one consistent object. Operation 618 includes calibrating the plurality of objects relative to the point of view of the at least one consistent object.

Figure 7:
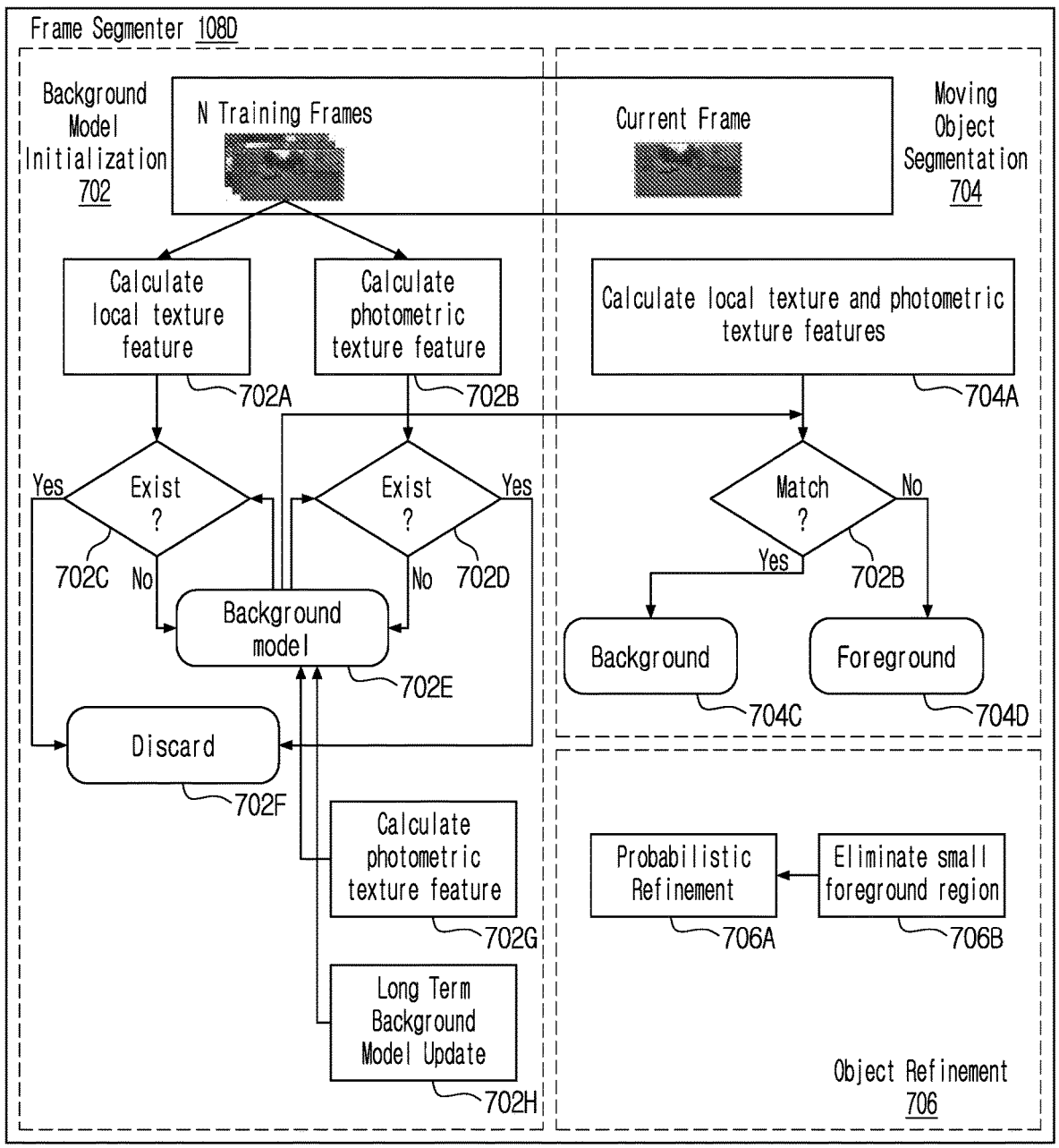
FIG. 7 illustrates segmenting video frames of a video sequence into a foreground segment and a background segment, according to an embodiment of the disclosure.

FIG. 7 illustrates segmenting, by a video frame extractor, video frames of a video sequence into a foreground segment and a background segment, according to an embodiment of the disclosure.

Referring to FIG. 7, in an electronic device 700, a generic background model of the video sequence is initialized 702 in conjunction with segmenting moving objects 704 in the video sequence. Video frames extracted by the frame extractor 108C are received by the frame segmenter 108D. Local texture features and photometric features of each of the video frames is determined for the background initialization 702A and 702B. Concurrently, local texture and photometric texture features of a current video frame received from the frame extractor 108C are determined. For the background model, if the local texture features and the photometric features have already been identified in operations 702C and 702D, the frame segmenter 108D moves to the next video frame among the plurality of video frames 702F. If not identified in operations 702C and 702D, these features are stored to generate a background model 702E. A background model is iteratively generated upon identifying all local texture features and photometric features across all the video frames. In the short term background model update, an abrupt and extensive scene change is identified by analyzing a current segmented result and a previous segmented result 702G. In the long term background model update, outcomes of background/foreground classification over a period of time is accumulated 702H. For moving object segmentation, calculate local texture and photometric features of a current video frame is matched to the background model 704B. If matched, the features are segmented as the background segment 704C and if not, the features are segmented as the foreground segment 704D. This is done across each of the plurality of video frames. In an embodiment, the segments undergo object refinement 706 via probabilistic refinement 706A and small foreground regions are eliminated 706B.

FIG. 8 is a flow diagram illustrating segmenting video frames of the video sequence into a foreground segment and a background segment, according to an embodiment of the disclosure.

Referring to FIG. 8, in a method 800, operation 802 includes identifying, by the frame segmenter 108D, a reference background model of each of the plurality of video frames by detecting an abrupt and extensive scene change among the plurality of video frames, wherein the background model corresponds to local texture features and photometric features of each of the plurality of video frames. Operation 804 includes segmenting the texture features and the photometric features of each of the plurality of video frames as a background segment if the texture features and the photometric features of the video frame match with the texture features and the photometric features of the background model. Operation 806 includes segmenting the texture features and the photometric features of each of the plurality of video frames as a foreground segment if the texture features and the photometric features of the video frame do not match with the texture features and the photometric features of the background model. Operation 808 includes updating the reference background model by accumulating the outcomes of segmenting each of the plurality of video frames into a background segment and a foreground segment.

FIG. 9 is a flow diagram illustrating detecting, by the video frame extractor (108) a plurality of objects across the plurality of video frames, according to an embodiment of the disclosure.

Referring to FIG. 9, in a method 900, operation 902 includes matching a plurality of feature points of the at least one consistent object between each pair of consecutive video frames in the video sequence using an Euclidean distance between feature vectors of consecutive video frames. Operation 904 includes determining a motion of each matched feature point between the corresponding pair of consecutive video frames. Operation 906 includes determining a relative displacement of the at least one consistent object based on a calibration of the motion of each matched feature with positional information pertaining to the electronic device. Operation 908 includes estimating the point of view of the at least one consistent object based on the relative displacement of the at least one consistent object.

FIG. 10 is a flow diagram illustrating spatial object creation by an object synthesizer, according to an embodiment of the disclosure.

Referring to FIG. 10, in a method 1000, Operation 1002 includes receiving the segmented video frames from the frame segmenter 108D by the object synthesizer 114. At operation 1004, the segmented video undergoes spatial and temporal analysis as a two stream network which is known in existing state of the art. Each frame is passed through a deep learning/training network to recognize the various objects in each frame and also to recognize action from the motion in the form of dense optical flow. At operation 1006, a feature contour map of the plurality of objects including the at least consistent object in the segmented plurality of frames is created. At operation 1008, the feature contour map is fused with the segmented plurality of video frames. If the feature contours match at operation 1010, the contour map is fused with the segmented video frame at operation 1012. The fused features are further compared to a reference three dimensional object at operation 1014. If matched, a boxed structure of the object is generated at operation 1018, and if not, the fused features are retained as a reference three dimensional object at operation 1016.

Figure 11:
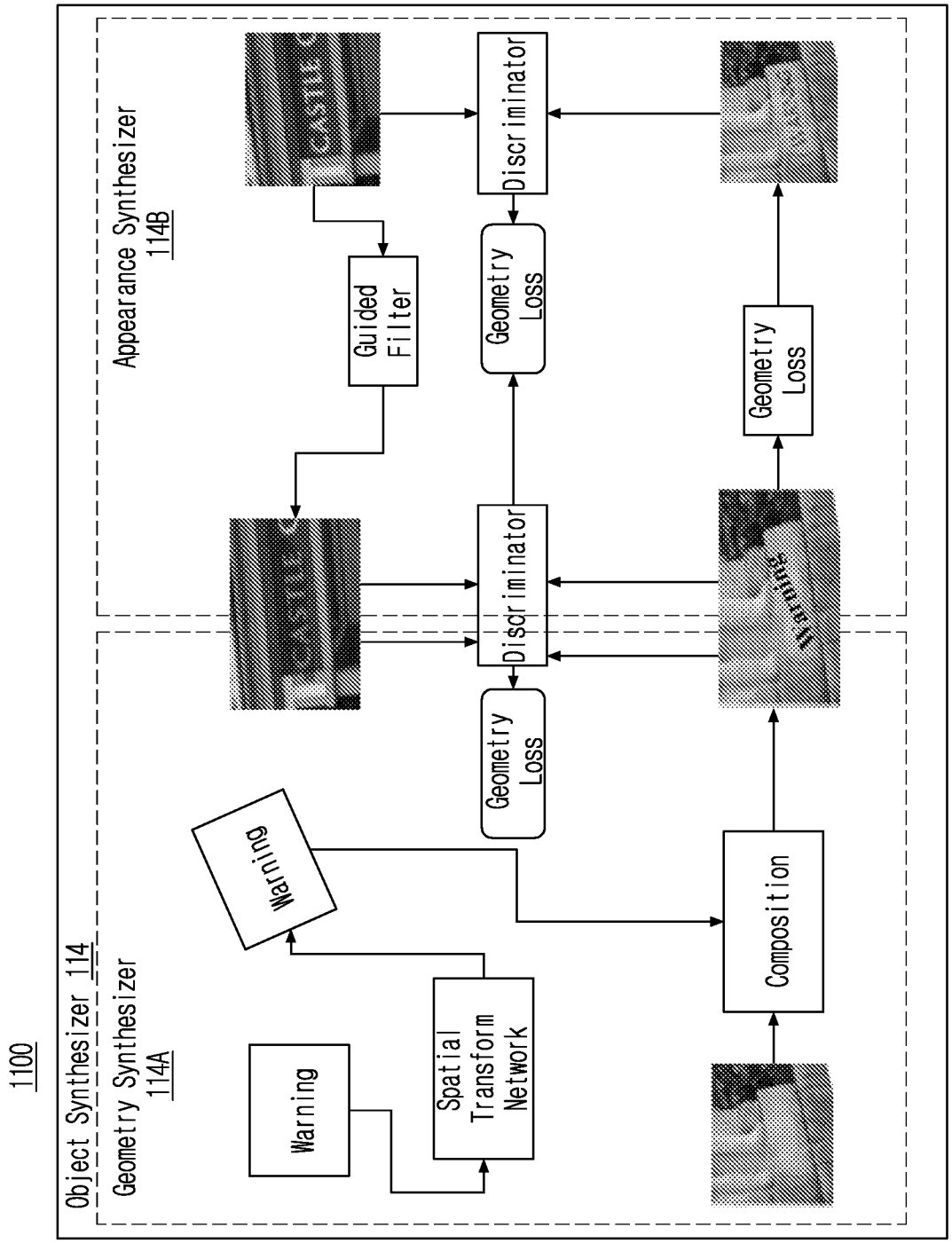
FIG. 11 illustrates spatial object creation, according to an embodiment of the disclosure.

FIG. 11 illustrates spatial object creation by an object synthesizer, according to an embodiment of the disclosure.

Referring to FIG. 11, the boxed structure as generated through the method illustrated in FIG. 10 needs to be synthesized with background/foreground segments of each of the video frames. For this purpose, a geometry synthesizer 114A and an appearance synthesizer 114B are used. In a scenario, the object with the text "Warning" is identified and regenerated as a three dimensional boxed structure. This is fused with the background and foreground segments of a frame as illustrated in FIG. 11 using deep learning. The orientation of the "Warning" object is predicted and further refined through a comparison with reference images as shown.

Figure 12:
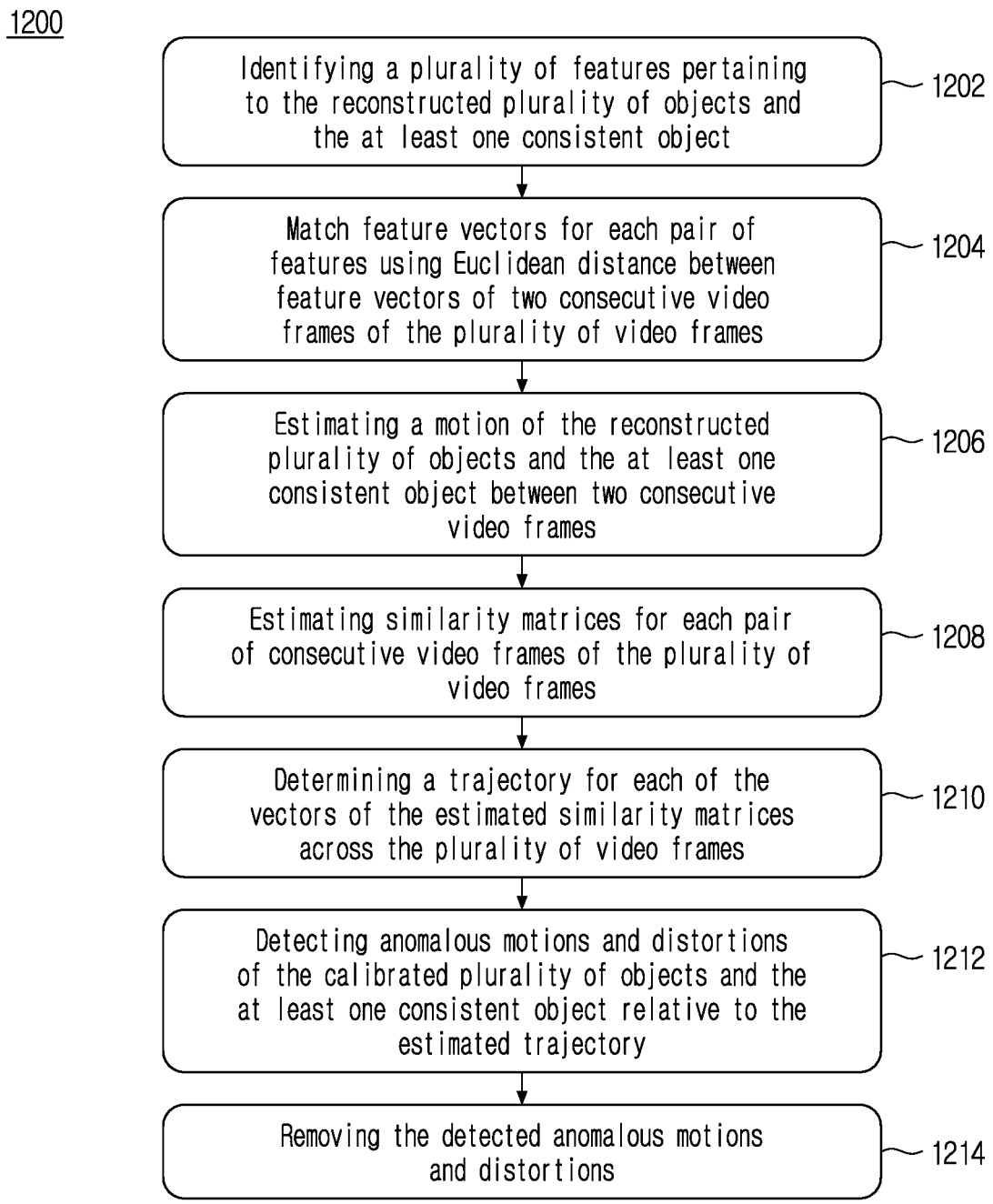
FIG. 12 is a flow diagram illustrating segmenting video frames of the video sequence into a foreground segment and a background segment, according to an embodiment of the disclosure.

FIG. 12 is a flow diagram illustrating video frame stabilization by the frame stabilizer 112, according to an embodiment of the disclosure.

Referring to FIG. 12, in a method 1200, Operation 1202 includes identifying a plurality of features pertaining to the reconstructed plurality of objects and the at least one consistent object. Operation 1204 includes matching feature vectors for each pair of features using Euclidean distance between two consecutive video frames of the plurality of video frames. Operation 1206 includes estimating a motion of the reconstructed plurality of objects and the at least one consistent object between two consecutive video frames. Operation 1208 includes estimating similarity matrices for each pair of consecutive video frames of the plurality of video frames. Operation 1210 includes determining a trajectory for each of the vectors of the estimated similarity matrices across the plurality of video frames. Operation 1212 includes detecting anomalous motions and distortions of the calibrated plurality of objects and the at least one consistent object relative to the estimated trajectory. Finally, operation 1214 includes removing the detected anomalous motions and distortions.

FIGS. 13, 14, 15, 16, and 17 illustrate scenarios where a captured video sequence is stabilized, according to various embodiments of the disclosure.

Referring to FIG. 13, scenario 1300 illustrates an object (The Taj Mahal) being captured from different points of views. Different points of views are used to describe the various feature of the object. However, without the point of view detection described in preceding paragraphs, the video sequence is subject to distorted features, due to multiple points of view and camera tilts.

Referring to FIG. 14, scenario 1400 illustrates the disparity between a linear point of view and a spherical point of view.

Figure 15:

Referring to FIG. 15, scenario 1500 is illustrated to depict the claimed subject matter. The camera lens 106 captures a raw video sequence as illustrated in video sequence 1502. Upon processing the video sequence 1502 using the electronic device 100, the Eiffel Tower is identified to be the subject in focus or the most consistent object. The point of view of the Eiffel Tower is determined and the objects in the video sequence are calibrated and reconstructed around the identified subject in frame sequence 1504. The video sequence is further stabilized by removing all anomalous motions and distortions that is directed to, but not limited to Camera shifts (translation), distortion (scaling) and undesirable motion (rotation).

Figure 16:
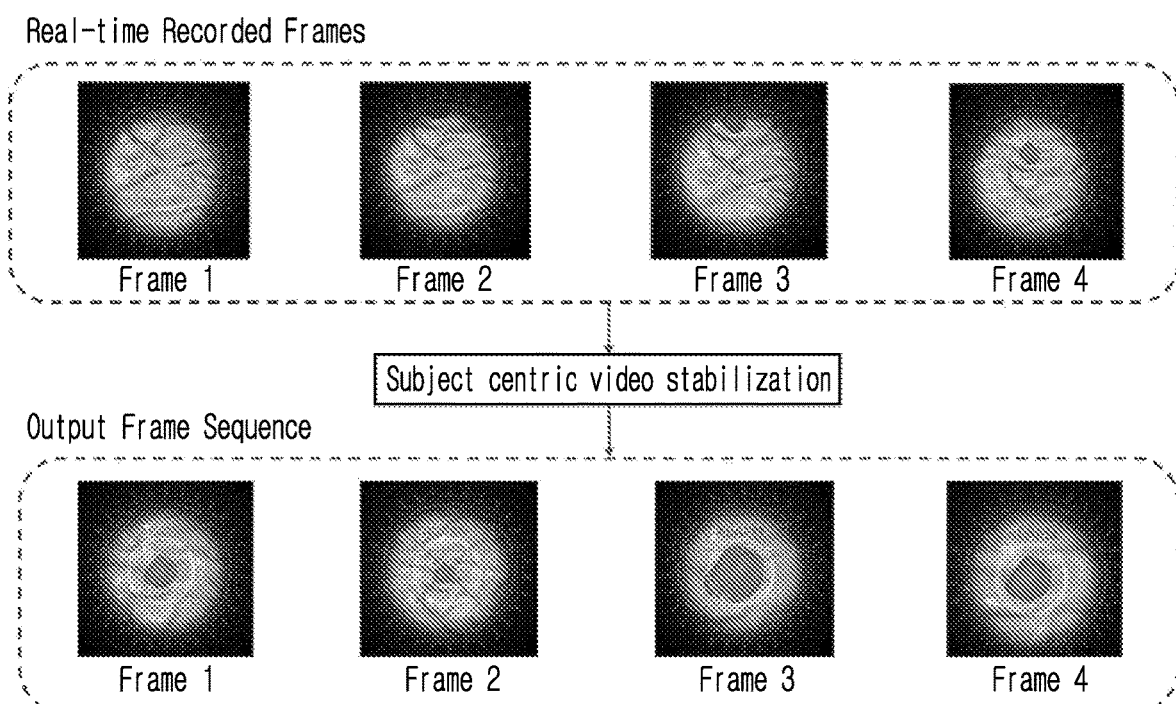

Referring to FIG. 16, in scenario 1600, subject centric video stabilization, in accordance with the embodiments described herein are implemented in endoscopy where a doctor may detect foreign objects after the video sequence is stabilized with respect to a subject.

Figure 17:
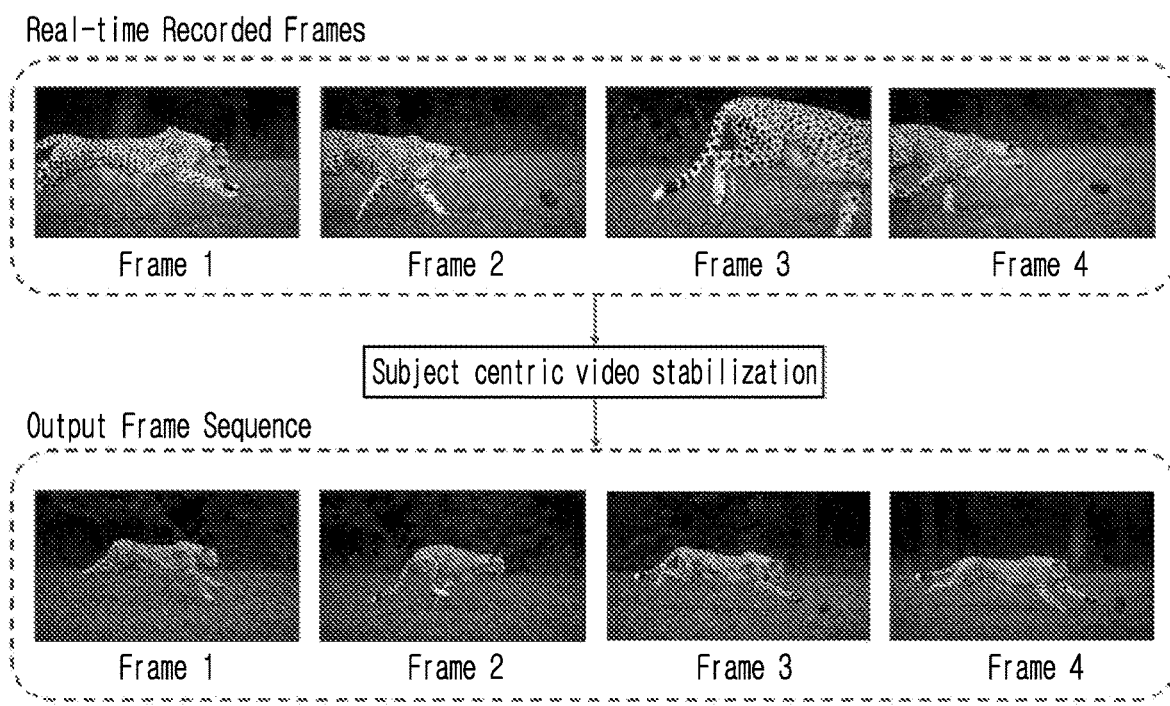

Referring to FIG. 17, in scenario 1700, subject centric video stabilization, in accordance with the embodiments described herein are implemented in wild-life photography where the subject in focus is a running leopard.

The foregoing description of the specific embodiments will so fully reveal the general nature of the embodiments herein that others can, by applying current knowledge, readily modify and/or adapt for various applications such specific embodiments without departing from the generic concept, and, therefore, such adaptations and modifications should and are intended to be comprehended within the meaning and range of equivalents of the disclosed embodiments. It is to be understood that the phraseology or terminology employed herein is for the purpose of description and not of limitation.

While the disclosure has been shown and described with reference to various embodiments thereof, it will be understood by those skilled in the art that various changes in form and details may be made therein without departing from the spirit and scope of the disclosure as defined by the appended claims and their equivalents.

What is claimed is:

1. A method performed by an electronic device for stabilization of a video sequence captured by the electronic device, the method comprising:
    identifying, by the electronic device, a subject in the video sequence;
    estimating, by the electronic device, a velocity of the subject relative to the electronic device;
    determining, by the electronic device, a point of view (PoV) of the electronic device that includes the subject in the video sequence based on the velocity of the subject relative to the electronic device; and
    stabilizing, by the electronic device, the video sequence by removing motions corresponding to a camera shift based on the determined PoV.

2. The method of claim 1, wherein the determining of the PoV of the subject in the video sequence with respect to the electronic device comprises:
    extracting, by the electronic device, a plurality of video frames from the video sequence;
    segmenting, by the electronic device, each of the plurality of video frames into a foreground segment and a background segment;
    detecting, by the electronic device, a plurality of objects in the foreground segment and the background segment of each of the plurality of video frames;
    identifying, by the electronic device, at least one consistent object, among the detected plurality of objects across the plurality of video frames, as the subject;
    detecting, by the electronic device, a PoV of the at least one consistent object; and
    calibrating, by the electronic device, the plurality of objects relative to the PoV of the at least one consistent object.

3. The method of claim 2, wherein the segmenting of each of the plurality of video frames into the foreground segment and the background segment comprises:
    identifying, by the electronic device, a reference background model of each of the plurality of video frames by detecting an abrupt and extensive scene change among the plurality of video frames, the background model corresponding to local texture features and photometric features of each of the plurality of video frames;
    segmenting, by the electronic device, the texture features and the photometric features of each of the plurality of video frames as a background segment in case that the texture features and the photometric features of the video frame match with the texture features and the photometric features of the reference background model;
    segmenting, by the electronic device, the texture features and the photometric features of each of the plurality of video frames as a foreground segment in case that the texture features and the photometric features of the video frame do not match with the texture features and the photometric features of the reference background model; and
    updating, by the electronic device, the reference background model by accumulating outcomes of the segmenting of each of the plurality of video frames into the background segment and the foreground segment.

4. The method of claim 2, wherein the detecting of the plurality of objects across the plurality of video frames comprises:
    matching, by the electronic device, a plurality of features between each pair of consecutive video frames in the video sequence; and
    detecting, by the electronic device, the plurality of objects across the plurality of video frames based on the matched plurality of features.

5. The method of claim 2, wherein the detecting of the PoV of the at least one consistent object comprises:
    matching, by the electronic device, a plurality of feature points of the at least one consistent object between each pair of consecutive video frames in the video sequence using a Euclidean distance between feature vectors of consecutive video frames;
    determining, by the electronic device, a motion of each matched feature point between a corresponding pair of consecutive video frames;
    determining, by the electronic device, a relative displacement of the at least one consistent object based on a calibration of the motion of each matched feature with positional information pertaining to the electronic device; and
    estimating, by the electronic device, the POV of the at least one consistent object based on the relative displacement of the at least one consistent object.

6. The method of claim 2, wherein the calibrating of the plurality of objects relative to the point of view of the at least one consistent object comprises:
    receiving, by the electronic device, the segmented plurality of video frames;
    performing, by the electronic device, spatial and temporal analysis on the plurality of objects;
    creating, by the electronic device, a feature contour map of each of the plurality of objects;
    fusing, by the electronic device, the feature contour map with each of the segmented plurality of video frames;
    generating, by the electronic device, a boxed structure of the plurality of objects in the segmented plurality of video frames; and generating, by the electronic device, a plurality of synthesized video frames with boxed structures of the plurality of objects and each of the segmented plurality of video frames.

7. The method of claim 2, wherein the stabilizing of the video sequence based on the determined PoV comprises:
estimating, by the electronic device, a motion trajectory of the calibrated plurality of objects and the at least one consistent object across the plurality of video frames;
detecting, by the electronic device, anomalous motions and distortions of the calibrated plurality of objects and the at least one consistent object relative to the estimated motion trajectory; and
removing, by the electronic device, the detected anomalous motions and distortions.

8. The method of claim 7, wherein anomalous motions and distortions is directed to camera shifts, distortion, and undesirable motion.

9. The method of claim 7, wherein the estimating of the motion trajectory of the calibrated plurality of objects and the at least one consistent object across the plurality of video frames comprises:
identifying, by the electronic device, a plurality of features pertaining to the calibrated plurality of objects and the at least one consistent object;
matching, by the electronic device, feature vectors for each pair of features using a Euclidean distance between two consecutive video frames of the plurality of video frames;
estimating, by the electronic device, a motion of the calibrated plurality of objects and the at least one consistent object between two consecutive video frames;
estimating, by the electronic device, similarity matrices for each pair of consecutive video frames of the plurality of video frames; and
determining, by the electronic device, a trajectory for each of the feature vectors of the estimated similarity matrices across the plurality of video frames.

10. The method of claim 7, further comprising:
aligning, by the electronic device, the calibrated plurality of objects and the at least one consistent object with a corresponding background segment and foreground segment of each of the plurality of video frames by matching features of the calibrated plurality of objects with features of the plurality of objects in foreground segments and background segments of each of the plurality of video frames;
aligning, by the electronic device, the motion trajectory of the calibrated plurality of objects and the at least one consistent object pertaining to a single frame across the plurality of video frames with the motion of the plurality of objects in the foreground segment and the background segment of each of the plurality of video frames;
transforming, by the electronic device, the plurality of objects in the foreground segments of each of the plurality of video frames to align with the corresponding plurality of objects in the background segments of each of the plurality of video frames;
reconstructing, by the electronic device, each of the plurality of video frames by fusing the plurality of objects;
creating, by the electronic device, at least one dense matching map of each of the plurality of video frames by matching each of the reconstructed plurality of frames corresponding to the point of view with the plurality of frames corresponding to other points of view; and
fusing, by the electronic device, the at least one dense matching map with the plurality of video frames pertaining to the video sequence.

11. An electronic device for stabilizing a captured video sequence, the electronic device comprising:
memory;
at least one processor;
a camera lens communicably coupled to the memory and the processor and being configured to capture a video sequence;
a video frame extractor communicably coupled to the memory and the processor and being configured to identify a subject;
a point of view (PoV) calibrator communicably coupled to the video frame extractor, the POV calibrator being configured to:
estimate a velocity of the subject relative to the camera lens, and
determine a PoV of the electronic device that includes the subject in the video sequence based on the velocity of the subject relative to the camera lens; and
a frame stabilizer communicably coupled to the POV calibrator and being configured to stabilize the video sequence by removing motions corresponding to a camera shift based on the determined PoV.

12. The electronic device of claim 11 wherein, to identify the subject, the video frame extractor is further configured to:
extract a plurality of video frames from the video sequence;
segment each of the plurality of video frames into a foreground segment and a background segment;
detect a plurality of objects in the foreground segment and the background segment of each of the plurality of video frames; and
identify at least one consistent object among the detected plurality of objects across the plurality of video frames.

13. The electronic device of claim 12, wherein, to segment each of the plurality of video frames into the foreground segment and the background segment, the video frame extractor is configured to:
identify a reference background model of each of the plurality of video frames by detecting an abrupt and extensive scene change among the plurality of video frames, wherein the background model corresponds to local texture features and photometric features of each of the plurality of video frames;
segment the texture features and the photometric features of each of the plurality of video frames as the background segment in case that texture features and photometric features of a video frame match with texture features and photometric features of the reference background model;
segment the texture features and the photometric features of each of the plurality of video frames as the foreground segment in case that the texture features and the photometric features of the video frame do not match with the texture features and the photometric features of the background model; and
update the reference background model by accumulating outcomes of segmenting each of the plurality of video frames into the background segment and the foreground segment.

14. The electronic device of claim 12, wherein, to detect the plurality of objects in the foreground segment and the background segment, the video frame extractor is configured to:
- match a plurality of features between each pair of consecutive video frames in the video sequence; and
- detect the plurality of objects across the plurality of video frames based on the matched plurality of features.

15. The electronic device of claim 12,
wherein the POV calibrator is communicably coupled to the video frame extractor, and
wherein, to determine the POV of the subject in the video sequence with respect to the camera lens, the POV calibrator is configured to:
- detect a PoV of the at least one consistent object; and
- calibrate the plurality of objects relative to the POV of the at least one consistent object.

16. The electronic device of claim 15, wherein, to detect the POV of the at least one consistent object, the PoV calibrator is configured to:
- match a plurality of feature points of the at least one consistent object between each pair of consecutive video frames in the video sequence using a Euclidean distance between feature vectors of consecutive video frames;
- determine a motion of each matched feature point between a corresponding pair of consecutive video frames;
- determine a relative displacement of the at least one consistent object based on a calibration of the motion of each matched feature with positional information pertaining to the electronic device; and
- estimate the POV of the at least one consistent object based on the relative displacement of the at least one consistent object.

17. The electronic device of claim 15, wherein, to calibrate the plurality of objects relative to the POV of the at least one consistent object, the PoV calibrator is configured to:
- receive the segmented plurality of video frames;
- perform spatial and temporal analysis on the plurality of objects;
- create a feature contour map of each of the plurality of objects;
- fuse the feature contour map with each of the segmented plurality of video frames;
- generate a boxed structure of the plurality of objects in the segmented plurality of video frames; and
- generate a plurality of synthesized video frames with boxed structures of the plurality of objects and each of the segmented plurality of video frames.

18. The electronic device of claim 15,
wherein the frame stabilizer is communicably coupled to the POV calibrator, and
wherein, to stabilize the video sequence, the frame stabilizer is configured to:
- estimate a trajectory of the calibrated plurality of objects and the at least one consistent object across the plurality of video frames;
- detect anomalous motions and distortions of the calibrated plurality of objects and the at least one consistent object relative to the estimated trajectory; and
- remove the detected anomalous motions and distortions.

19. The electronic device of claim 18, wherein the anomalous motions and distortions are directed to camera shifts, distortion, and undesirable motion.

20. The electronic device of claim 18, wherein, to estimate the trajectory of the calibrated plurality of objects and the at least one consistent object across the plurality of video frames, the frame stabilizer is configured to:
- identify a plurality of features pertaining to the calibrated plurality of objects and the at least one consistent object;
- match feature vectors for each pair of features using a Euclidean distance between two consecutive video frames of the plurality of video frames;
- estimate a motion of the calibrated plurality of objects and the at least one consistent object between two consecutive video frames;
- estimate similarity matrices for each pair of consecutive video frames of the plurality of video frames; and
- determine a trajectory for each of the feature vectors of the estimated similarity matrices across the plurality of video frames.

* * * * *